US012676530B2

(12) United States Patent
Hayashi et al.

(10) Patent No.: US 12,676,530 B2
(45) Date of Patent: Jul. 7, 2026

(54) INTERCONNECTOR ASSEMBLY COMPRISING AN OPTIMIZED GASKET

(71) Applicant: VALEO EQUIPEMENTS ELECTRIQUES MOTEUR, Creteil (FR)

(72) Inventors: Rafael Hayashi, St Quentin Fallavier (FR); Abdelaziz Kebbache, Creteil Cedex (FR); Loic Vapillon, St Quentin Fallavier (FR); José Sanchez, St Quentin Fallavier (FR); Baptiste Bruyere, St Quentin Fallavier (FR); Jean Philippe Badey, Etaples-sur-Mer (FR); Didier Selosse, Etaples-sur-Mer (FR); Venkatesan Kuppusamy, Chennai (IN); Charlie Zanella, St Quentin Fallavier (FR); Frédéric Patey, St Quentin Fallavier (FR)

(73) Assignee: VALEO EQUIPEMENTS ELECTRIQUES MOTEUR, Creteil Cedex (FR)

( * ) Notice: Subject to any disclaimer, the term of this patent is extended or adjusted under 35 U.S.C. 154(b) by 236 days.

(21) Appl. No.: 18/573,244

(22) PCT Filed: Jun. 17, 2022

(86) PCT No.: PCT/EP2022/066560
§ 371 (c)(1),
(2) Date: Dec. 21, 2023

(87) PCT Pub. No.: WO2023/274753
PCT Pub. Date: Jan. 5, 2023

(65) Prior Publication Data
US 2024/0291346 A1 Aug. 29, 2024

(30) Foreign Application Priority Data
Jun. 29, 2021 (FR) ...................................... 21 06990

(51) Int. Cl.
*H02K 5/22* (2006.01)

(52) U.S. Cl.
CPC ..................................... *H02K 5/225* (2013.01)

(58) Field of Classification Search
CPC .......... H02K 3/50; H02K 3/521; H02K 3/522; H02K 5/22; H02K 5/225; H02K 11/33; H02K 2203/09
See application file for complete search history.

(56) References Cited

U.S. PATENT DOCUMENTS

| | | | |
|---|---|---|---|
| 7,211,914 B2 | 5/2007 | Hofmann et al. | |
| 8,323,004 B2 | 12/2012 | Homma et al. | |

(Continued)

FOREIGN PATENT DOCUMENTS

| | | |
|---|---|---|
| DE | 196 46 617 A1 | 5/1998 |
| EP | 1 361 644 A2 | 11/2003 |

(Continued)

OTHER PUBLICATIONS

Bouarroudj, Machine Translation of FR3051997, Dec. 2017 (Year: 2017).*

(Continued)

*Primary Examiner* — Eric Johnson
(74) *Attorney, Agent, or Firm* — Oblon, McClelland, Maier & Neustadt, L.L.P.

(57) ABSTRACT

An assembly for an interconnector of an electric machine includes an interconnector housing having a recess opening and one track per phase. Each track includes a connection end to be connected to a phase output, a gasket mounted on the interconnector housing and including a dividing wall partially closing the connection recess opening, and at least one sealing grommet extending from the dividing wall toward the connection recess opening. The grommet includes a conduit extending toward the connection recess (Continued)

opening, a phase output sealing opening passing through the conduit to lead a phase output into the connection recess opening, and a gaiter extending from the dividing wall to the conduit.

20 Claims, 12 Drawing Sheets

(56)                    References Cited

U.S. PATENT DOCUMENTS

| | | | | |
|---|---|---|---|---|
| 2006/0006094 A1 * | 1/2006 | Hofmann | ............... | H02K 29/08 |
| | | | | 206/706 |
| 2010/0090635 A1 * | 4/2010 | Andersen | ........... | F04D 13/0686 |
| | | | | 310/71 |
| 2020/0195079 A1 * | 6/2020 | Devermann | ............. | H02K 5/10 |

FOREIGN PATENT DOCUMENTS

| | | | | |
|---|---|---|---|---|
| FR | 3051997 A1 * | 12/2017 | ............ | H02K 11/33 |
| JP | 55-112463 U | 8/1980 | | |
| JP | 56-145347 U | 11/1981 | | |
| JP | 7-20060 U | 4/1995 | | |
| JP | 2002-5019 A | 1/2002 | | |

OTHER PUBLICATIONS

International Search Report issued Sep. 21, 2022 in PCT/EP2022/066560, filed on Jun. 17, 2022, 3 pages.

* cited by examiner

INTERCONNECTOR ASSEMBLY COMPRISING AN OPTIMIZED GASKET

TECHNICAL FIELD OF THE INVENTION

The technical field of the invention is that of rotary electric machines cooled by a coolant fluid such as a starter-alternator or a reversible machine or an electric motor for a self-propelled mobile device.

In the following text, a self-propelled mobile device is understood to mean a vehicle for transporting goods or people, which comprises its own traction system for moving, such as the combustion engine or electric motor of a car, truck, bicycle or an object that moves with its own traction system such as a drone. Such a self-propelled mobile device may further comprise autonomous driving.

The present invention relates to the sealing at the interconnector and in particular to an assembly for connecting the phase outputs of the stator to a control housing of the machine.

TECHNOLOGICAL BACKGROUND OF THE INVENTION

Rotary electric machines comprise a stator and a rotor which in operation generate a large quantity of heat.

The stator comprises a lamination stack provided with slots, which are equipped with slotted insulators for mounting the stator coil. The coil comprises a plurality of phase windings inserted in the slots of the lamination stack and obtained for example from a continuous enamel-covered wire or from conducting elements in the form of bars, such as U-shaped or I-shaped pins. These phase windings are for example 3-phase windings which are connected in a star or in a delta configuration, with the phase outputs connected via an interconnector housing to an item of power electronics. The ends of each phase, each referred to as a "phase output", are connected to a connection end of a track of the interconnector housing so that they can be connected to an item of power electronics or to one another in order to form a neutral.

When a current circulates in the windings, this results in heat due to the resistance of each coil of the winding, and this is known as Joule effect or Joule losses. In general, the greater the (electrical or mechanical) power of the electric machine, the greater the amount of heat produced by the windings.

The rotor may comprise magnets, and since the rotor is surrounded by the stator, each magnet is heated under the effect of the temperature of the stator, which also affects the performance of the magnets.

In order to avoid excessive overheating of the stator coil and of the rotor magnets, it is known practice for electric machines to be cooled by a liquid in order to increase the effectiveness of the cooling in order to improve the output and maximum mechanical power of the machine, using a liquid such as oil or glycol water which has a better heat transfer flowing around the stator in order to cool same. However, these machines require a complex and expensive hydraulic circuit particularly on account of the problems of sealing which are associated with the expansions and vibrations of these machines.

For example, electric machines in which the rotor and the stator are bathed in the liquid coolant are known. The continuous wire or the bar-form conducting elements comprises an insulator in the stator, but the region of connection between the ends of the phase outputs that are connected by soldering to the connection ends of the tracks of the interconnector housing need to be bared before they can be soldered. It is therefore necessary for this region of connection to be sealed against the coolant that might give rise to shorting and/or corrosion of the phase outputs and of the connection ends.

The applicant is therefore familiar with producing a sealed connection recess, referred to hereinafter as connection recess, for each connection region by using a flexible membrane closing an opening in the bearing, through which opening a phase output passes and forming the closed end of the sealed connection recess. The interconnector housing comprises a body overmolding the track and sandwiching the flexible membrane with the bearing. The body of the interconnector housing comprises an opening of the connection recess through which the connection end emerges. The connection recess therefore houses the connection region comprising the bared portion of the phase output and of the connection end and the soldering. In order to simplify the soldering process and avoid damage to the outline of the connection recess, the soldering is preferably performed before an outline of this recess is formed. After soldering, the connection recess comprises a reservoir mounted on the body of the interconnector housing, forming the contour by surrounding the connection region and which is filled with resin so as to prevent the coolant coming into contact with the connection region. This resin is therefore introduced in liquid state into this sealed connection recess and then subsequently hardens in order to seal the connection region in the connection recess.

However, such a connection recess carries the risk of resin escaping to outside the recess when the resin is in the liquid state.

In particular, liquid-state resin may leak between the opening in the flexible membrane and the phase output that passes through this opening as a result, for example, of vibrations and/or of changes in position of the phase-output emergence with respect to the membrane as the assembly with the stator having the connection recess filled with liquid-state resin moves around.

Furthermore, in the case of a phase output of a coil that is made of hard wire, for example a hairpin, if the opening in the membrane is not perfectly aligned with the phase output that passes through it, there is a risk of the membrane gaping, thereby changing the shape of the opening, with this change in shape causing leaks.

Any resin that has come out of the connection recess will harden and may cause significant damage to the electric machine. For example, if the resin passing through the opening in the membrane by brushing past the phase output may fall into the air gap and harden, causing the rotor to seize. The resin may also fall into and harden in an inlet or outlet of the liquid-coolant circuit, which may prevent or reduce the circulation of the liquid coolant in the electric machine.

There is therefore a need for a connection recess that is simpler for mounting while at the same time reducing the risk of the resin leaking when the resin is in the liquid state.

SUMMARY OF THE INVENTION

The invention offers a solution to the aforementioned problems by providing a sealing gasket, through which a phase output passes, that is able to ensure sealing between this phase output and the sealing gasket while at the same time leaving the phase output the freedom to move with respect to the sealing gasket.

One aspect of the invention relates to an electric machine assembly comprising:

an interconnector housing comprising:

an interconnector body comprising at least one connection recess opening passing through the body, and intended to be filled with resin, one track per phase, each track comprising a connection end to be connected to a phase output, a gasket mounted on the interconnector housing and comprising:

a dividing wall partially closing the connection recess opening, and at least one flexible sealing grommet for a phase output, the sealing grommet extending from the dividing wall, toward the connection recess opening, the grommet comprising:

a conduit extending toward the connection recess opening, a phase output sealing opening passing through the conduit to lead a phase output into the connection recess opening, a gaiter extending from the dividing wall to the conduit to allow the conduit to move as a phase output is being inserted into the sealing opening.

By virtue of the invention, the gaiter allows the conduit to be able to move and thus reduce the risk, brought about by the phase output, of leakage through the sealing opening. Specifically, the conduit is able to adopt different orientations thanks to the gaiter which gives it the freedom to move and therefore reduces the risk of the opening in the conduit becoming deformed during the insertion of the phase output or as a result of vibrations during filling.

Besides the features that have just been mentioned in the previous paragraph, the assembly according to one aspect of the invention may have one or more additional features from among the features mentioned in the following paragraphs, said features being considered individually or in any technically feasible combination:

According to one embodiment, the conduit of at least one grommet extends into the connection recess.

According to one embodiment, the connection end extends from the interconnector body starting from the connection recess opening. This enables the phase output to be aligned with the connection end at the time of soldering, or even enables the phase output to be guided and its position adjusted, making it possible to have more repeatable conditions for soldering. Specifically, this makes it possible to reduce the separation between the phase output and the connection end (possibly even eliminating it).

According to another embodiment, the connection end extends from the interconnector body, starting from a surface of the body that is perpendicular to an axis of insertion of a phase output into the connection recess. The grommet makes it possible to have flexibility of the phase output for connection to the connection end.

According to one embodiment, the conduit comprises at least an internal lip extending in the conduit right around the sealing opening in order to deform and seal the sealing opening by coming into contact with the phase outputs. The lips make it possible to reduce the risk of leaks in the sealing opening by deforming as the phase output is being inserted, also compensating for the tolerances on the dimensions of the phase outputs. In addition, the lips and the gaiter together reduce the risk of leakage in the event of poor alignment between the sealing opening and the phase output or if there is vibration as the stator with the interconnector comprising the assembly having its connection recess filled with resin still in the liquid state moves around.

According to one example of this embodiment, the cross section of the opening at the at least one lip is smaller than the minimum cross section of the phase output that is intended to enter the sealing opening. This makes it possible to ensure that the lip is deformed when the phase output is inserted and therefore to ensure sealing between the lip and the phase output.

According to one example of this embodiment, the sealing opening has an axis of insertion of a phase output toward the connection end and in that the number of internal lips right around the sealing opening for coming into contact with the phase outputs is greater than or equal to two, and in that the internal lips are situated one after another in the direction of insertion all along the sealing opening. This makes it possible to reduce the risk of leakage.

According to one example of this embodiment, each conduit comprises at least one lip which extends at the outlet of the sealing opening toward the interconnector housing. This makes it possible to have a lip at the end with respect to the gaiter, thereby reducing the risk of gaping of the lip when the gaiter is deformed.

According to one embodiment, the gasket comprises:

a sealing face comprising a surface deformed against the interconnector housing, a bearing face on the opposite side to the sealing face, and in that the gaiter has a concave surface on the same side as the sealing face and a convex surface on the same side as the bearing face.

This enables the gaiter to be able to move toward the interconnector housing as the phase output is being inserted into the sealing opening, unlike a reverse gaiter described in the next embodiment.

According to one example of this embodiment, wherein the concave surface forms a groove around the conduit with respect to the dividing wall. This on the one hand enables the conduit to solidify when the resin has hardened and on the other hand enables the conduit to be left the freedom to move toward the interconnector body.

According to another embodiment, the sealing gasket comprises:

a sealing face sealing against the interconnector housing, a bearing face on the opposite side to the sealing face, and in that the gaiter has a convex surface on the same side as the sealing face and a concave surface on the same side as the bearing face.

According to another embodiment than the preceding one, the sealing gasket comprises:

a sealing face comprising a surface deformed against the interconnector housing, a bearing face on the opposite side to the sealing face, and in that the gaiter has a convex surface on the same side as the sealing face and a concave surface on the same side as the bearing face.

According to one embodiment, the sealing opening has a cross section similar in shape to the cross section of the phase output intended to receive. For example, the cross section of the sealing opening is rectangular in order to receive a phase output of rectangular cross section.

According to one embodiment, the assembly comprises a bearing body fixed to the interconnector housing and comprising a planar surface which with the interconnector body compresses a deformed portion of the sealing gasket surrounding the dividing wall, and in that the bearing body comprises at least one phase output passage passing through the planar surface.

According to one example of this embodiment, and the embodiment having a convex surface of the gaiter on the same side as the sealing face of the gasket, the bearing body comprises a grommet recess into which the phase output passage opens, and in that the convex surface of the gaiter comprises a part situated in the grommet recess. That makes it possible to prevent the bearing body from bearing against the gaiter, thus making it possible to avoid reducing the freedom of movement of the conduit. The grommet recess has a cross section, the cross-sectional area of which is greater than that of the end of the phase output passage that opens onto the grommet recess.

According to one example of this embodiment, and the embodiment having a convex surface of the gaiter on the same side as the sealing face of the gasket, the bearing body comprises a grommet recess having a cross section that is greater than a cross section between guide walls of the phase output passage so as to provide a clearance between the free convex surface of the gaiter and the surface of the recess. That means that the gaiter is not deformed before the phase output is inserted into the sealing opening of the conduit.

According to one example of this embodiment, the assembly comprises bearing-body or interconnector-body fixing means intended for mounting the assembly on a bearing of an electric machine.

According to one example of this embodiment, the bearing body is clipped onto the interconnector housing.

According to one variant of the preceding example of this embodiment, the bearing body is a bearing of an electric machine.

Another aspect of the invention relates to an electric machine comprising:

the assembly of the invention as described hereinabove, with or without the various above-described features of the embodiments, a stator comprising phase outputs passing through the corresponding sealing opening and the at least one corresponding connection recess opening, wherein each phase output end is fixed to a corresponding connection end, resin filling the connection recess opening in contact with the sealing gasket forming a sealed interconnector.

According to one embodiment of this machine, the interconnector comprises a reservoir fixed to the interconnector housing forming a connection recess surrounding at least one phase output fixed to a corresponding connection end, the connection recess being filled with resin. This makes it possible to have space in which to perform the soldering operation more easily and then, after soldering, create the connection recess into which to introduce the resin.

According to one example of this embodiment, the reservoir is fixed by clip-fastening means onto the interconnector housing.

According to another example of this embodiment, the means for fixing the interconnector body to the reservoir comprises an undercutting of the walls of the reservoir and/or a retaining cavity for fixing the reservoir to the interconnector body using the resin.

According to another embodiment, the resin on its external faces comprises traces of demoulding of a reservoir comprising an undercut. This makes it possible to have space in which to perform the soldering operation more easily and then, after soldering, create the connection recess.

According to one embodiment, the stator and the interconnector are mounted blind into the yoke frame which at its end comprises the bearing, and in that the interconnector body comprises a fixing means in the form of a finger tightly fitted into a recess in the bearing in order to attach the interconnector to the bearing.

The invention and its various applications will be better understood from reading the following description and from examining the accompanying figures:

Another invention, which is not claimed, relates to an electric machine assembly comprising:

an interconnector housing comprising:

an interconnector body comprising at least one connection recess opening passing through the body, and intended to be filled with resin, one track per phase, each track comprising a connection end to be connected to a phase output, a gasket mounted on the interconnector housing and comprising:

a dividing wall closing the connection recess opening, and at least one flexible sealing grommet for a phase output, the sealing grommet extending from the dividing wall, into the connection recess opening, the grommet comprising:

a conduit extending into the connection recess opening toward the connection ends, a phase output sealing opening passing through the conduit to lead a phase output into the connection recess opening, at least an internal lip extending in the conduit right around the sealing opening in order to deform and seal the sealing opening by coming into contact with the phase outputs.

Besides the features that have just been mentioned in the previous paragraph, the assembly according to one aspect of the invention may have one or more additional features from among the preceding features mentioned in the preceding paragraphs of the invention, of the assembly of the invention, said features being considered individually or in any technically feasible combination.

BRIEF DESCRIPTION OF THE FIGURES

The figures are presented by way of non-limiting indication of the invention.

FIG. 7b shows a schematic depiction of a cross section through the sealing gasket depicted in FIG. 7a.

FIG. 7c shows a schematic depiction of a cross section through a grommet of the sealing gasket depicted in FIG. 7a.

FIG. 10b shows a schematic depiction, in another three-dimensional view, of the bearing body of FIG. 10a.

DETAILED DESCRIPTION

The figures are presented by way of non-limiting indication of the invention.

Figure 1:
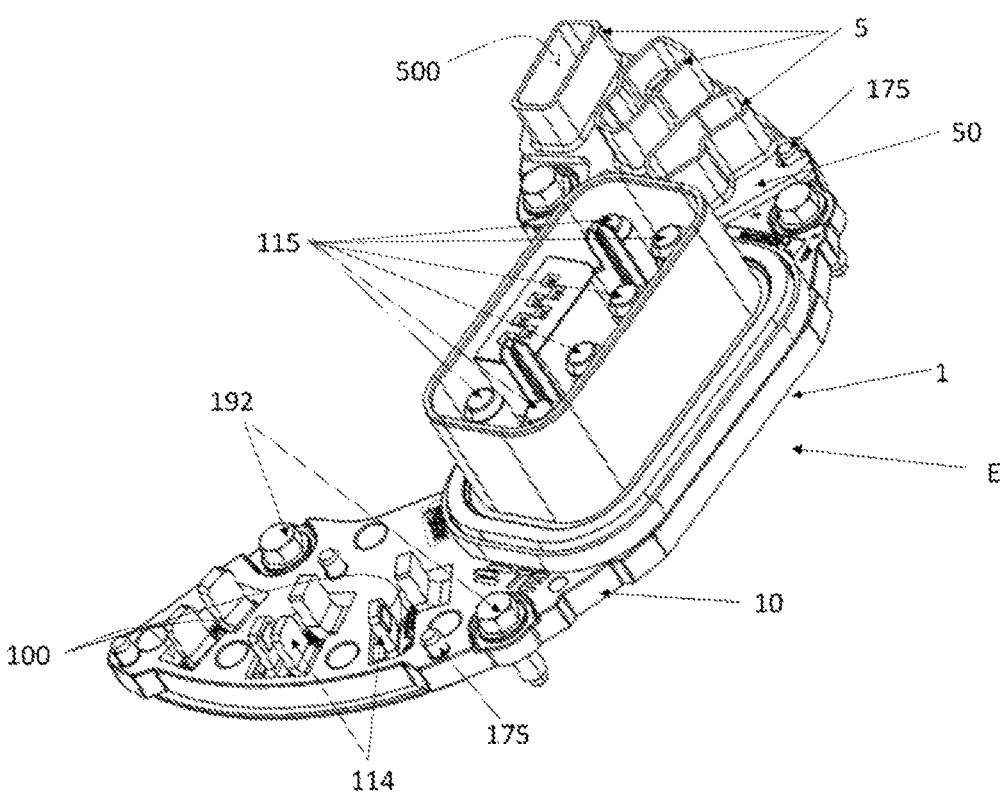
FIG. 1 shows a schematic depiction in a three-dimensional view, of an assembly for forming an interconnector, according to a first embodiment of the invention, with reservoirs.
Figure 3:
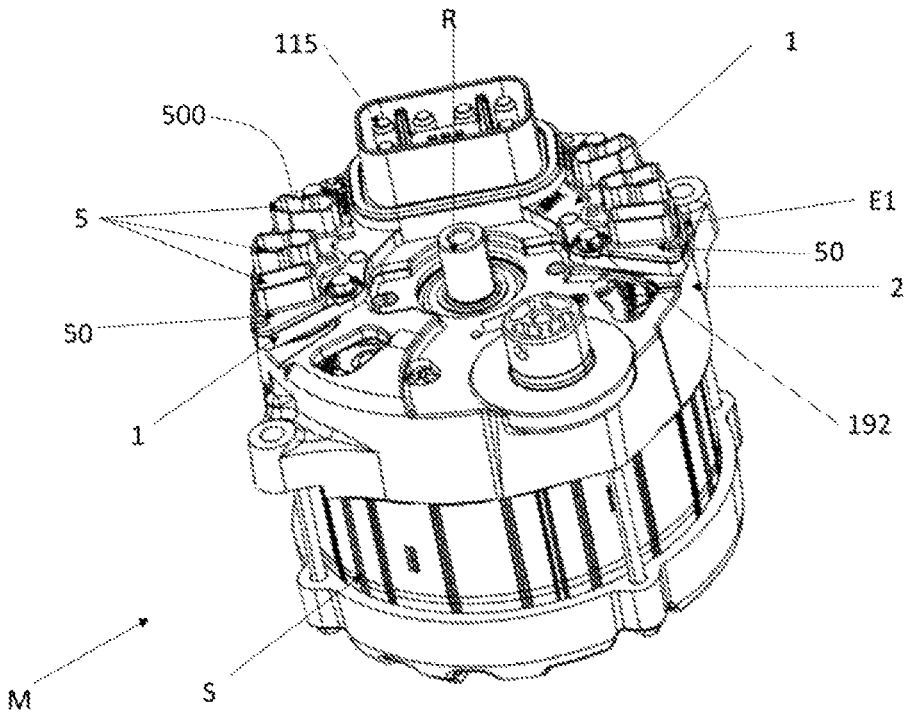
FIG. 3 shows a schematic depiction of an electric machine comprising an interconnector formed by the assembly depicted in FIG. 1.

FIG. 1 shows a schematic depiction of an assembly E and three reservoirs 5 to form an interconnector E1 referenced in FIG. 3, which is intended to be mounted on a bearing 2 of a liquid-cooled electric machine M such as the one depicted for example in FIG. 3. The interconnector E1 enables phase outputs 4 (referenced and visible in FIG. 4 which depicts a cross section through the machine M) of a coil S4 of the electric machine M to be connected to an item of power electronics. The electric machine M comprises a rotor R surrounded by a stator S comprising the coil S4.

The assembly E is a preassembly of a sealed interconnector E1, which is therefore intended to be connected to phase outputs 4 of a coil and to contain resin in order to seal the connection. The assembly E comprises an interconnector housing 1 comprising a body 10 comprising at least one connection recess through-opening 100 intended to be filled with resin. In this example, the body 10 comprises six connection recess openings 100, only three of which are visible in FIG. 1.

Figure 4:
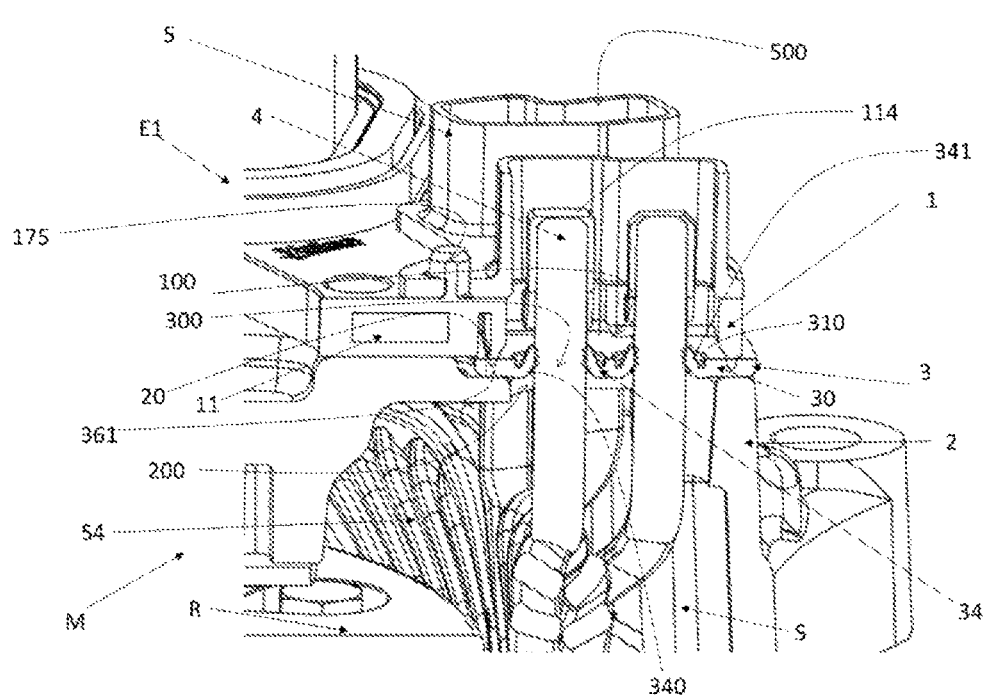
FIG. 4 shows a schematic depiction of a cross section through part of the electric machine of FIG. 3.

Furthermore, the interconnector housing 1 comprises at least one track 11, referenced in FIG. 4. In this particular instance, the interconnector housing 1 comprises several tracks 11 for connecting to phases of the coil S4 (referenced in FIG. 4) and notably for connecting the connections of the coil S4 to the power electronics. Each track 11 has at least one connection end 114 for connecting it to a phase output 4 which may be a wire or a hairpin of round or rectangular cross section.

The interconnector housing 1 comprises at least one track 11 per phase comprising a connection end 114 for connecting it to a phase output 4 and a connection output 115 intended to be connected to connections of the power electronics. In this example, the interconnector body 10 is overmolded over the tracks 11 for two three-phase phase systems. There is therefore one connection track per phase (in this particular instance 6 phases) for each connecting one phase output 4 to the connections of an item of power electronics which is intended to be connected to the six connection outputs 115.

In this example, the interconnector housing 1 comprises other tracks 11 for making connections between phase outputs 4. In this example, each three-phase system is set up in the star configuration. There are here two tracks 11 for each neutral of a three-phase system which tracks are connected to one another by a phase output 4 which is soldered to and between two connection ends 114 of the two tracks 11. Two connection ends 114 of two tracks which are intended to be connected by a phase output 4 in emerging from the connection recess opening 100 between two other connection recess openings 100 can be seen in FIG. 1.

In this example, the interconnector housing 1 thus comprises three tracks 11 for connecting a phase output 4 to one of the three connection outputs 115 per three-phase system and two tracks for connecting the neutral. The three connection ends 114 of these three tracks 11 each emerge from a corresponding connection recess opening 100 and are situated radially closer to the center through which an axis is intended to pass than the four connection ends 114 of the neutral connection.

Of course, the interconnector housing could comprise fewer or more tracks, for example it could comprise six tracks per three-phase system with the phases arranged in the Delta configuration.

In this example, each connection end 114 emerges from the body 10 in the connection recess opening 100 and extends so as to enter a connection recess 500 (explained hereinbelow) via its connection recess opening 100, three of the connection recesses 500 being depicted in FIG. 1 (those representing the other three connection recess openings 100 are not visible in FIG. 1).

According to another example which has not been depicted, each connection end 114 does not emerge from the body 10 via the connection recess opening 100 but comprises at least one part intended to be in a connection recess 500 opening onto a connection recess opening 100.

Each connection recess 500 is formed, in this embodiment, by a reservoir 5 intended to be mounted on the interconnector body 10 after the phase output 4 and the connection end 114 have been soldered together, so as to simplify the soldering. However, according to another example, the reservoir 5 could directly form part of the body 10 (be of one-piece therewith).

Each reservoir 5 therefore has a volume that forms the connection recess 500 extending the connection recess opening 100 in order to surround a soldered connection between a phase output 4 of a coil of the electric machine M and a connection end 114. Once the phase outputs 4 and the connection ends 114 have been soldered together, this volume that forms the connection recess 500 is filled with resin in a liquid state, which then solidifies to a solid state. In what follows, a sealed interconnector E1, depicted in FIG. 3, is the term used when the assembly E has had its connection ends 114 soldered to the phase outputs 4 and the resin in the connection recess 500 has reached the solid state. In order to simplify the depiction, the resin has not been depicted in the figures.

In this particular instance, in this example, the sealed interconnector E1 comprises two reservoir bodies 50 visible in FIG. 3, each comprising several reservoirs 5, although each reservoir 5 could be independent.

In this embodiment, each reservoir 5 comprises means of attachment to the interconnector body 10. In this particular instance, in this example, the reservoir body 50 is bonded to the interconnector housing 1. The interconnector body 10 in this example comprises indexing means 175 for the reservoir body 50. In this example, the reservoir body 50 comprises slots corresponding to the indexing means 175 which in this instance are reaching the form of a stud which fits into a slot.

The resin, not depicted, filling the connection recess 500 remains contained as it transitions to the solid state in the connection recess 500, surrounding the connection end 114, the soldered joint and the phase output 4. Each reservoir 5 may also have its wall at an undercut angle in the connection recess 500, to improve the securing of the reservoir body 50 to the interconnection housing 1 by the solid-state resin in this connection recess 500.

Of course other examples of how to secure the reservoirs to the interconnector body 10 may be envisioned in this embodiment, such as clip-fastening for example.

Figure 5:
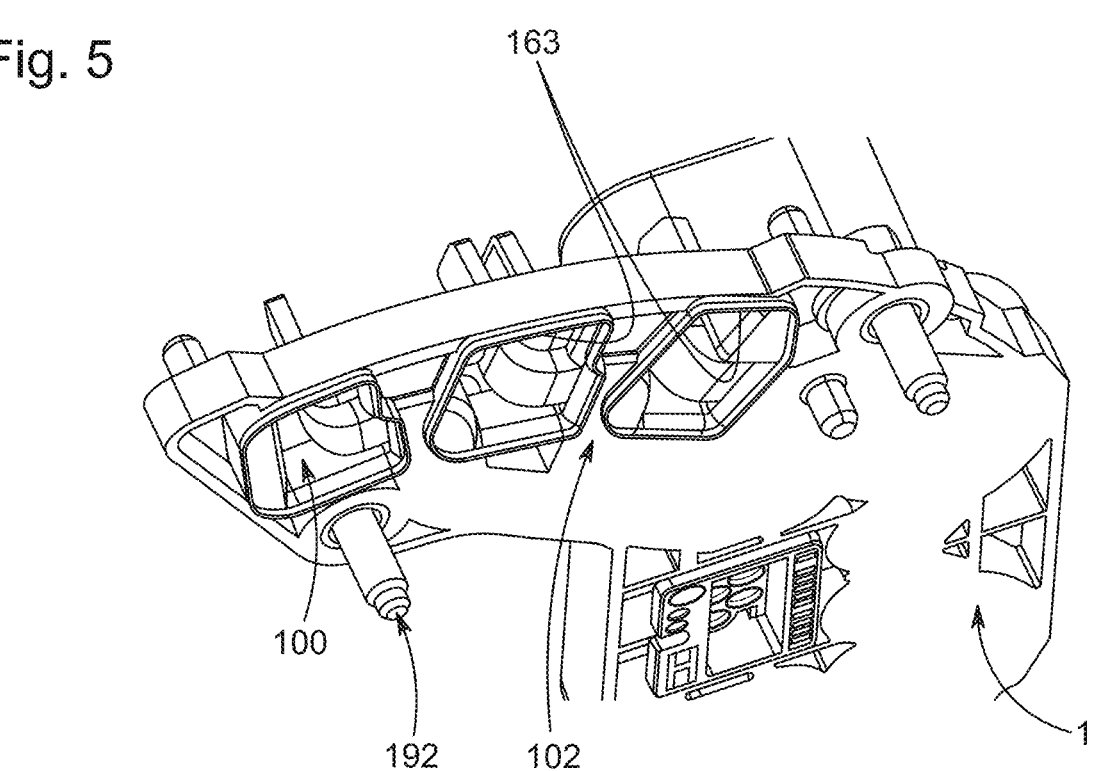
FIG. 5 shows a partial schematic depiction of an interconnector housing of the assembly depicted in FIG. 1.

The assembly E also further comprises at least one sealing gasket 3 mounted against a planar surface 102 of the interconnector body 10 of the interconnector housing 1 depicted on its own in FIG. 5. In this embodiment, the sealing gasket 3 is intended to be compressed between the interconnector housing 1 and the bearing of the electric machine M that forms a bearing body 2 for the assembly E. In this example, the assembly E comprises one sealing gasket 3 per three-phase system, namely two sealing gaskets 3 here.

According to another example which has not been depicted, the assembly E may comprise just one sealing gasket 3 for the two three-phase systems, or else one sealing gasket 3 per connection recess opening 100.

Figure 7A:
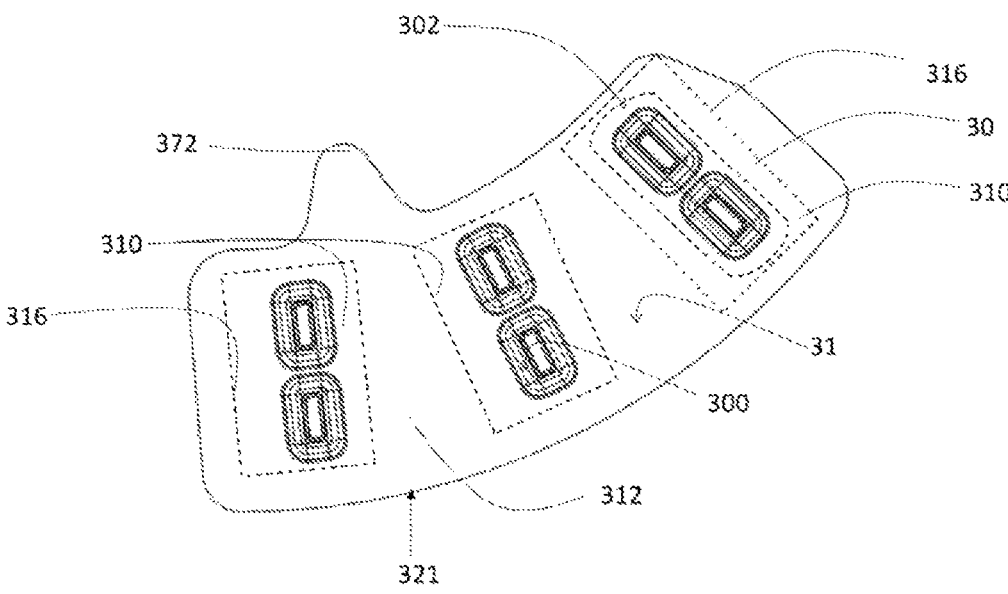
FIG. 7a shows a schematic depiction, in perspective viewed from the interconnector housing, of a gasket depicted in FIG. 1.
Figure 7B:
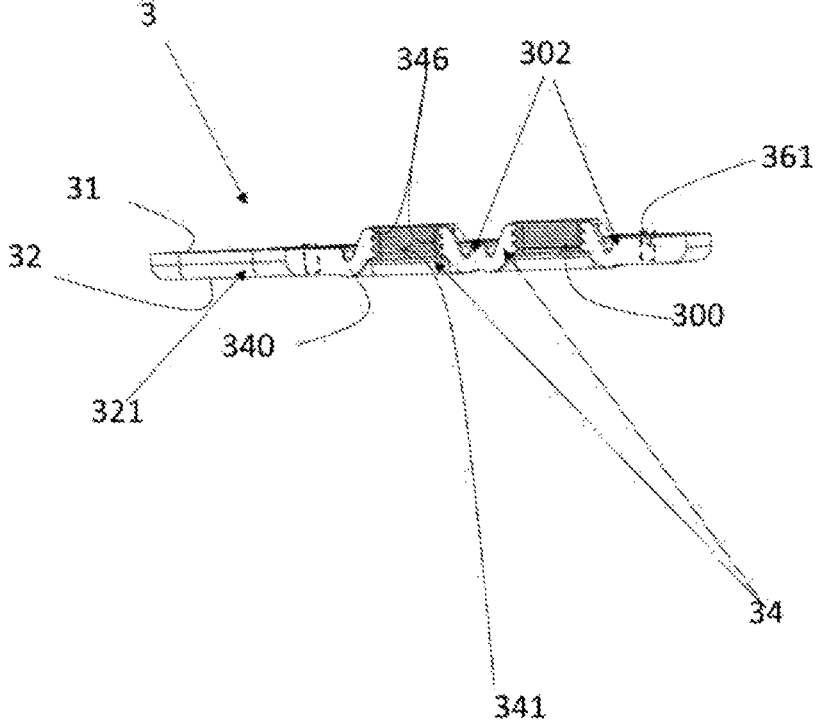
Figure 7C:
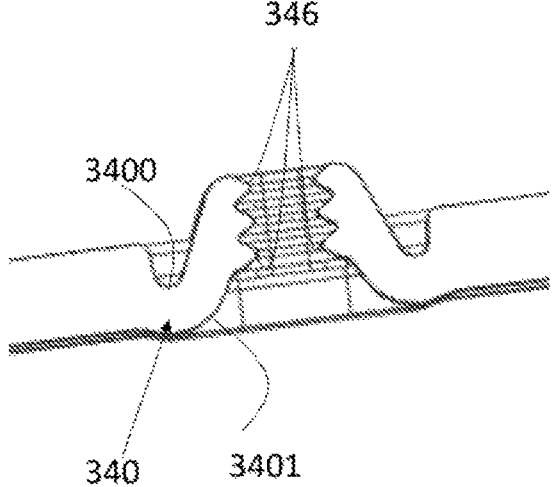

The sealing gasket 3 is depicted in FIGS. 7a, 7b, 7c. The sealing gasket comprises a dividing wall 30 partly closing the connection recess opening 100, as visible in FIG. 2.

The sealing gasket 3 further comprises at least one flexible sealing grommet 34 for a phase output 4. In this example, the sealing gasket 3 comprises as many grommets 34 as the multi-phase system has phase outputs 4 to be connected, namely six phase outputs in this particular instance here. Each grommet 34 extends from the dividing wall 30, in the connection recess opening 100.

Each grommet 34 comprises a conduit 341 extending into the connection recess opening 100 toward the connection ends 114.

Each grommet 34 comprises a phase output sealing opening 300 passing through the conduit 341 to lead a phase output 4 into the connection recess opening 100.

Each grommet 34 further comprises a gaiter 340 extending from the dividing wall 30 to the conduit 341 to allow the conduit 341 to move as a phase output 4 is being inserted into the sealing opening 300.

Figure 6:
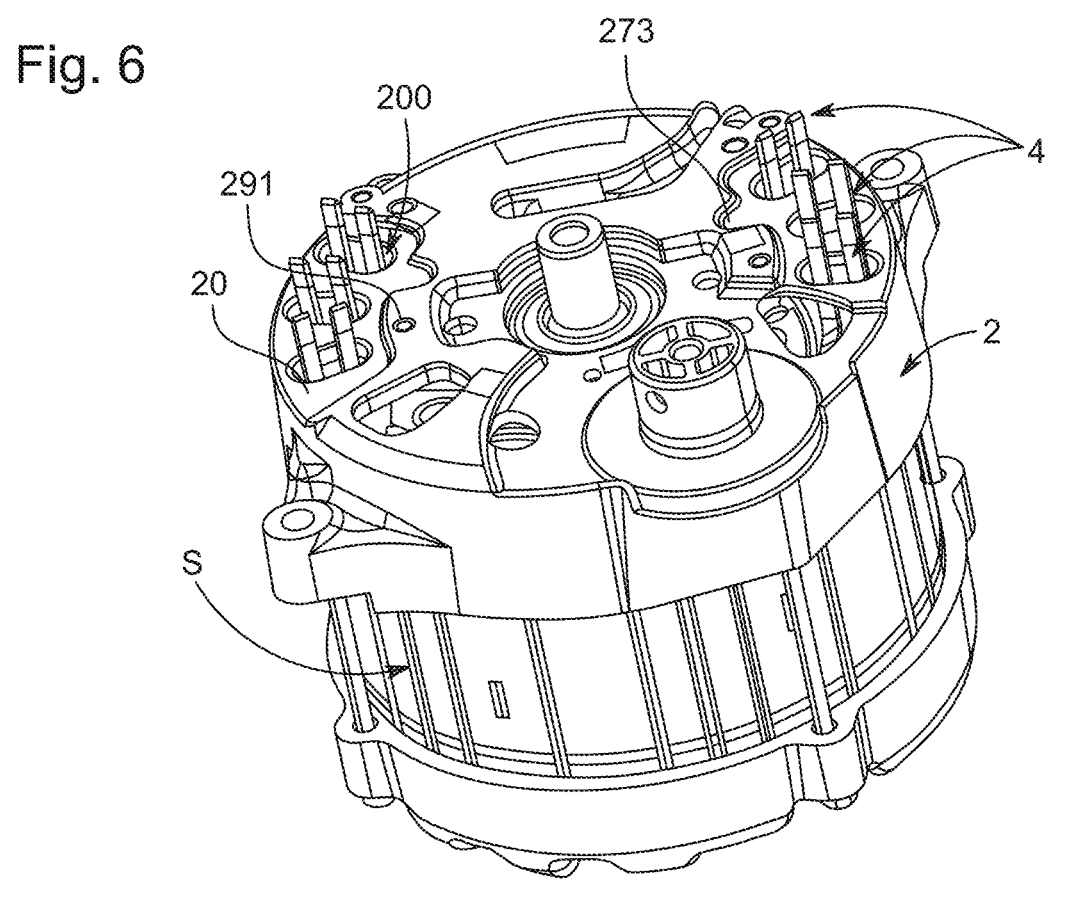
FIG. 6 shows a schematic depiction of the electric machine of FIG. 3 without the assembly of FIG. 1.

In this embodiment, each sealing opening 300 is also intended to be mounted facing a phase output passage 200 of the bearing body 2 (in this instance the bearing) visible in FIG. 6. In this particular instance, in this example of this embodiment, the bearing body 2 comprises a phase output passage 200 for two phase outputs 4 of one phase of the coil S4.

The sealing gasket 3 therefore comprises one sealing opening 300 per phase output, facing the corresponding phase output passage 200, and facing a connection recess opening 100 of the interconnector housing 1.

In this example of this embodiment there is therefore one connection recess opening 100 (visible in particular in FIG. 5) for two sealing openings 300, and one connection recess 100 per phase output passage 200.

Two sealing openings 300 are therefore aligned with the phase output passage 200 and the connection recess opening 100, so as to allow two phase outputs 4 (of the one phase) to pass through them and each be soldered to the corresponding connection end 114.

The sealing gasket 3 therefore comprises a sealing face 31, facing the interconnector housing 1, having at least one surface 316 that is deformed against the interconnector housing 1 and explained hereinafter.

The sealing gasket 3 therefore comprises a bearing face 32 on the opposite side to the sealing face 31.

The gaiter 340 thus gives the conduit 341 the flexibility to adapt to the vibrations, assembly clearances, deformations during assembly and soldering-together of the phase output 4 and the connection end 114 thus providing better sealing when the resin is poured into the connection recess 500.

The gaiter 340 surrounds the conduit 341 and comprises a concave surface 3400 on the same side as the sealing face 31, and a convex surface 3401 on the same side as the bearing face 32. The concave surface 3400 forms a groove around the conduit 34 with respect to the dividing wall 30.

In order to further improve the sealing at this sealing opening 300, the conduit 341 comprises at least one lip 346 extending toward the center of the sealing opening 300 so as to come into contact with the corresponding phase output 4. In this particular instance, in this example, the conduit 341 comprises three lips 346 but could have fewer or more of these. In this example, the conduit comprises at least one lip 346 which extends at the outlet of the sealing opening 300 at the same end as the interconnector housing 10 so as to prevent resin from entering the sealing opening 300. The other two lips 346 are therefore a redundant backup sealing feature.

Optionally, the conduit 341 comprises the maximum of lips 346 situated one after another in the direction of insertion along the entire length of the sealing opening 300. Here, in this example, the maximum number is three, but by making a conduit that is longer in the direction of the sealing opening it is possible to have further lips 346.

The lips 346 deform as a phase output 4 is inserted and form a sealing zone to prevent resin in the liquid state from running between the lips 346 and the phase output 4. In this example, the three lips 346 each preferably at their own level form a cross section for the sealing opening 300 that is identical in shape (for example round or rectangular) to that of the phase output 4 (whether this is a wire or a hairpin). Furthermore, as a preference, each cross section of the sealing opening 300, at a lip 346, has a cross-sectional area that is smaller than the cross section of the phase output 4 that is intended to pass through the sealing opening 300. Thus, as a phase output 4 is inserted into the sealing opening 300, the lips 346 come into contact with the phase output 4, by bending toward the connection recess 100, to create a seal between the phase output 4 and the lip 346.

Furthermore, in order to improve the sealing between the sealing gasket 3 and the interconnector body 10, in this embodiment, the dividing wall 30 of the sealing gasket 3 comprises a deformed portion 361, indicated in dotted line and in simplified form in FIG. 7*b*, and indicated compressed in FIG. 4. This deformed portion 361 is more compressed than an intermediate portion 321 of the dividing wall 30 of the sealing gasket 3. The deformed portion 361 comprises at least one deformed surface 316 depicted schematically likewise in dotted line in FIG. 7*a* on the same side as the sealing face 31 facing the interconnector body 10, and deformed with respect to a first surface 312 of the intermediate portion 321, by the interconnector body 10. This deformed surface 316 completely surrounds the at least one sealing opening 300 for the phase output(s) 4, in this instance in this embodiment, two sealing openings 300.

In this example, the planar surface 102 of the interconnector body 10 faces the first surface 312 of the sealing gasket 3. The interconnector body 10 comprises a bearing projection 163, visible in FIG. 5, extending from this planar surface 102 all around the connection recess 100. The bearing projection 163 compresses the deformed portion 361 which on the opposite side presses against a planar surface 20 of the bearing body 2, forming the deformed surface 361 by deforming it with respect to the first surface 312 of the sealing gasket 3. This deformation forms a sealing zone to prevent resin in the liquid state from running between the sealing gasket 3 and the interconnection housing 1. Each sealing zone therefore here surrounds a connection recess opening 100 that opens onto two sealing openings 300, namely in this example one bearing projection 163 per phase so as to surround the two phase outputs 4 thereof. The sealing gasket 3 therefore comprises, on the sealing face 31 of the dividing wall 30, a filling surface 310 between the grommets 34 and the deformed surface 361 which will become covered in resin when the resin is introduced into the connection recess opening 100.

Furthermore, in this embodiment, the connection recess opening 100 has a cross section that is greater than the cross section of the phase output passage 200. The dividing wall 30 of the gasket 3 therefore, when compressed, comprises a membrane portion 302, visible in FIG. 7*b*, delimited between the grommet 34 and the phase output passage 200. This membrane portion 302 separates the connection recess opening 100 from the phase output passage 200. A membrane portion 302 is also referenced in FIG. 7*a* in dotted line on the sealing face 31, corresponding to the limits of the phase output passage 200 on the same side as the bearing face 32.

Figure 2:
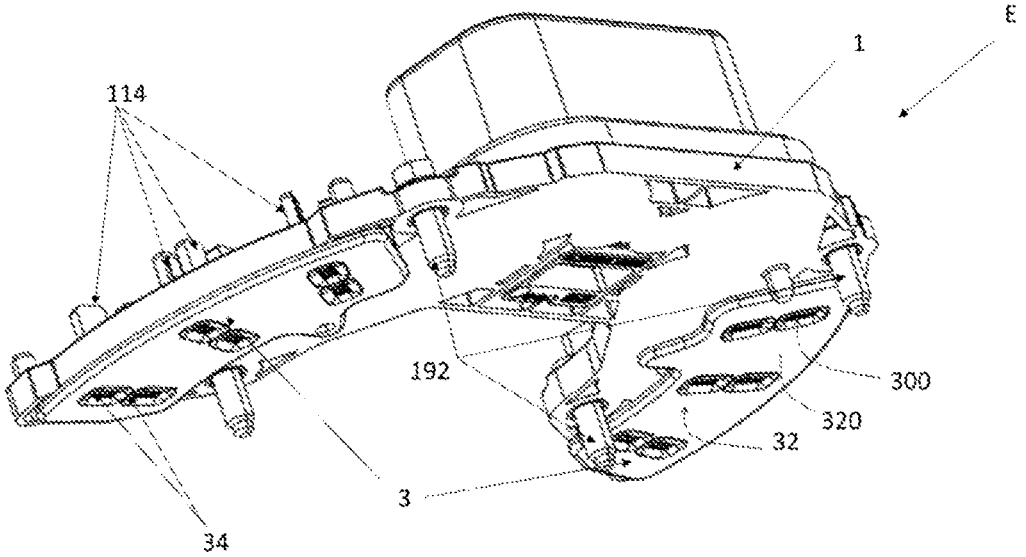
FIG. 2 shows a schematic depiction in another three-dimensional view, of the assembly according to a first embodiment of the invention.

The sealing gasket 3 comprises, in this example of this embodiment, an indexing feature 372 where one of the two sealing gaskets 3 comprises a hole visible in FIG. 2. The planar surface 20 of the bearing body 2 has a shape corresponding to that of the sealing gasket 3, namely an indexing feature 273 corresponding to that of the indexing feature 372 so as to allow the assembly E to be positioned correctly against the bearing body 2.

Furthermore, the assembly E comprises fixing means 192 for attachment to the bearing body 2 which comprises corresponding fixing means 291. In this example, the fixing means 291 belonging to the bearing body 2 are tapped holes and the fixing means 192 belonging to the assembly E are screws passing through a hole in the interconnector body 10. Thus, as the fixing means 192, 291 are screwed together, interconnector body 10 compresses the sealing gasket 3, pressing a bearing surface 320 on the same side as the bearing face 32 intimately against the planar surface 20 of the bearing body 2, and in particular, the projections 163 each compress a deformed surface 316 of the deformed portion 316 which is more deformed and compressed than the intermediate portion 321.

Thus, for example, the method for assembling the sealed interconnector E1 comprises a step of attaching the assembly E to the bearing body 2, here in this example a bearing of the electric machine M, followed by a step of inserting the stator S comprising the coil S4 by inserting the phase outputs 4 of the coil S4 into the corresponding phase output passage 200, thereafter each passing through the corresponding sealing opening 300 and each emerging from the connection recess opening 100. The assembly method next comprises a step of soldering each phase output 4 to its corresponding connection end 114. The assembly method next comprises a step of bonding each reservoir body 50 to the interconnector body 10. The method for assembling the interconnector and comprises a step of filling the connection recess 500 with resin, pouring it into the connection opening 100 until it reaches the filling surface 310 of the sealing gasket 3. Finally, the method for assembling the interconnector E1 comprises a step of waiting for the resin in the connection recess 500 to solidify in order to protect the soldered joint, the phase output 4 and the connection end 114 from the machine cooling liquid, thus forming the sealed interconnector E1.

Figure 8:
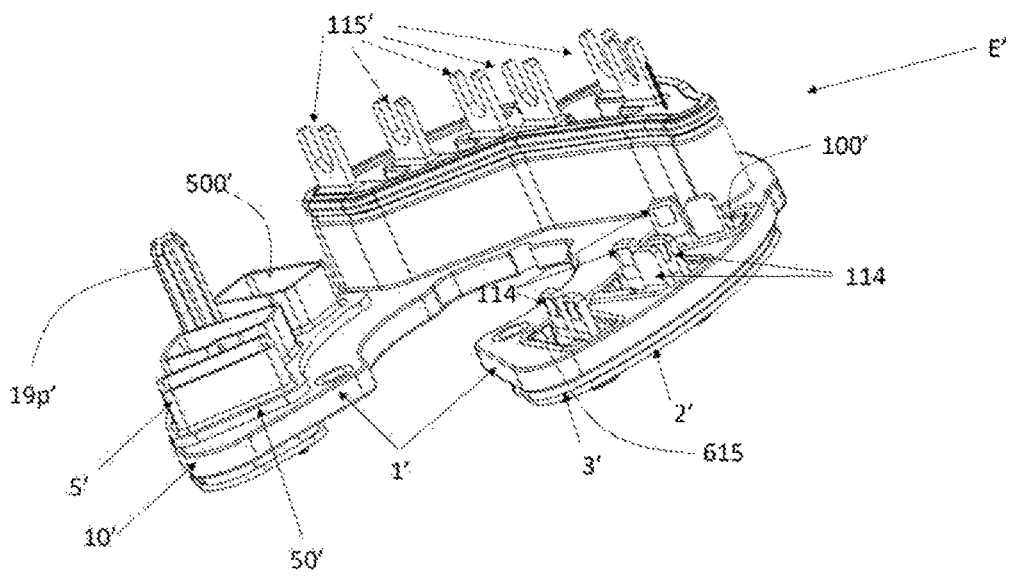
FIG. 8 shows a schematic depiction, in a three-dimensional view, of an assembly according to a second embodiment of the invention.
Figure 11:
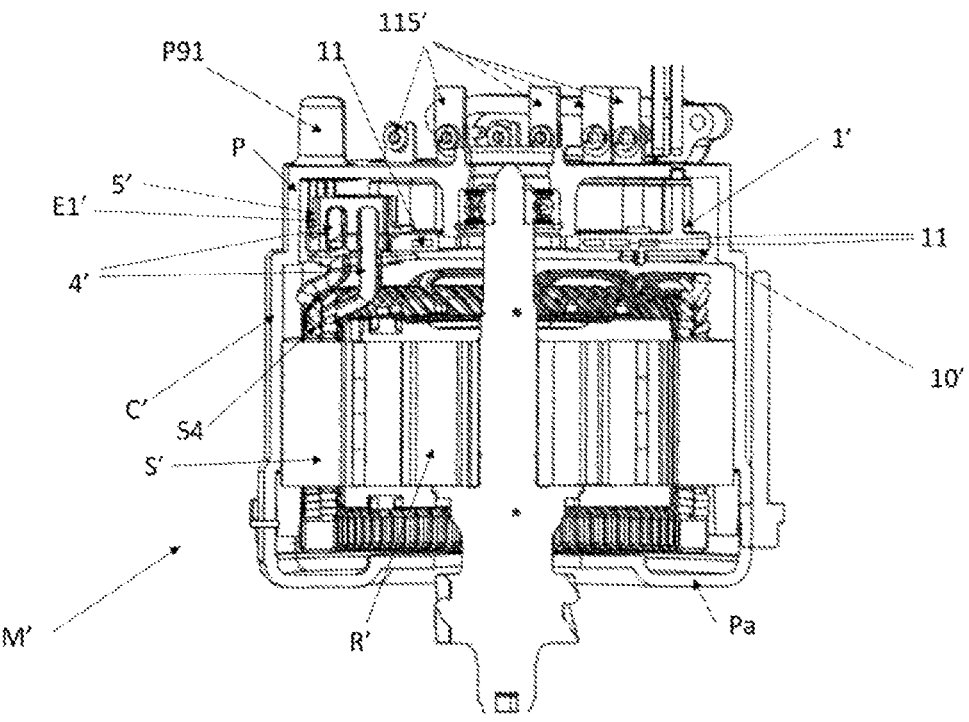
FIG. 11 shows a schematic depiction of a cross section through an electric machine comprising an interconnector formed by the assembly of FIG. 8.

FIG. 8 depicts an assembly E' according to a second embodiment of how to form an interconnector E1' depicted in FIG. 11 which shows a cross section through a machine M' comprising this interconnector E1'. The assembly E' and the interconnector E1' differ from those of the first embodiment in terms of the features described in the paragraphs below. The features that are new take a new reference numeral and a prime suffix (') is added to the reference numeral of those features that have been modified. The other features that are identical or similar bear the same reference numerals.

Figure 9:
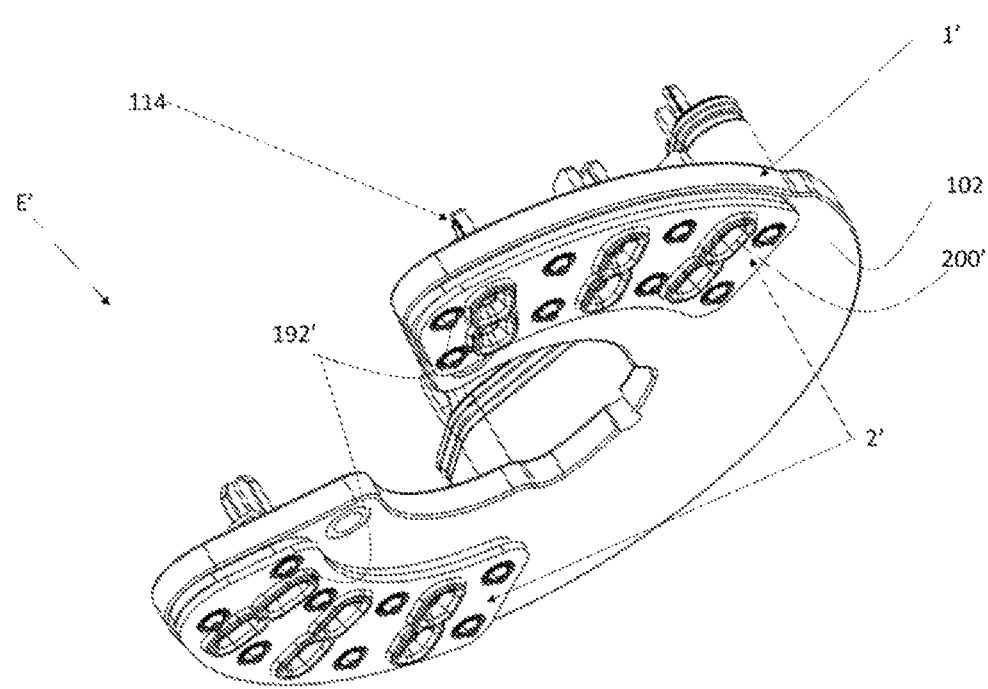
FIG. 9 shows a schematic depiction, in another three-dimensional view, of the assembly of FIG. 8.
Figure 10A:
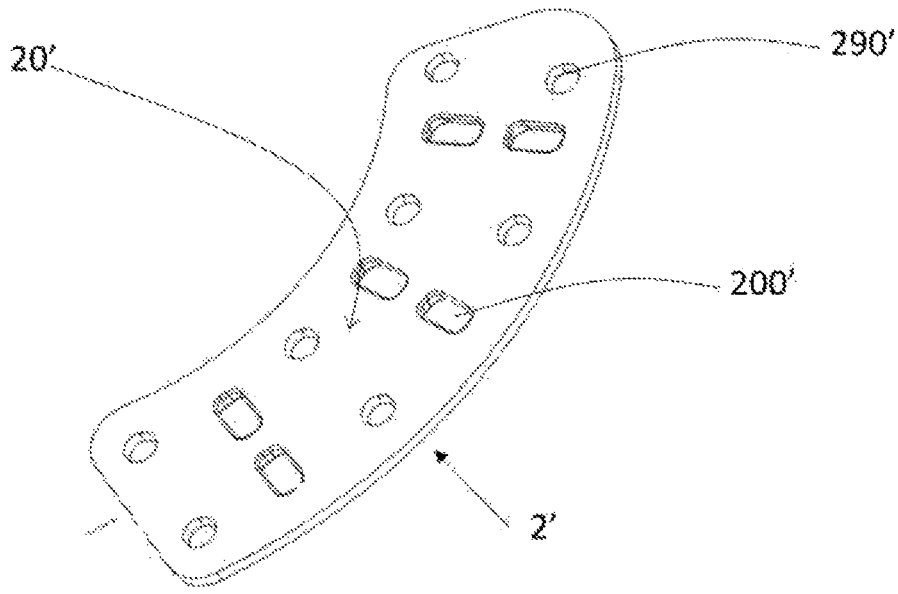
FIG. 10a shows a schematic depiction, in a three-dimensional view, of a bearing body of the assembly of FIG. 8.
Figure 10B:
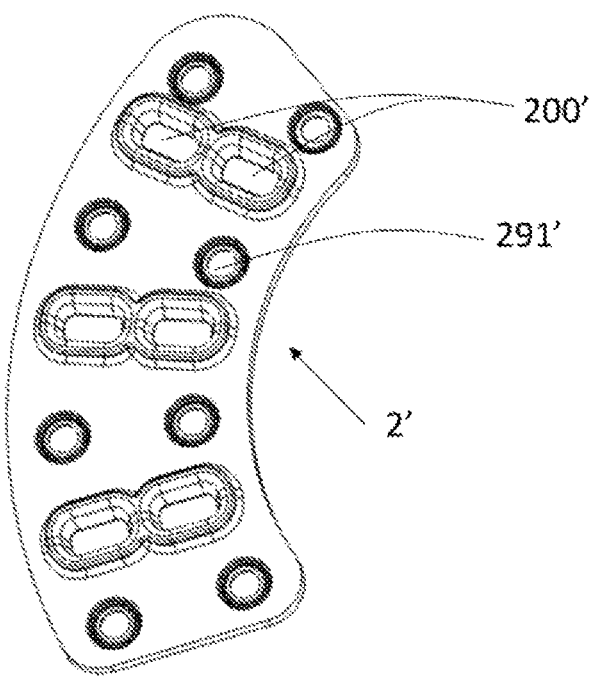

In this second embodiment, the assembly E' comprises the bearing body 2' visible in FIG. 9. The bearing body 2' is depicted in FIGS. 10*a* and 10*b* from its two different sides.

Figure 12:
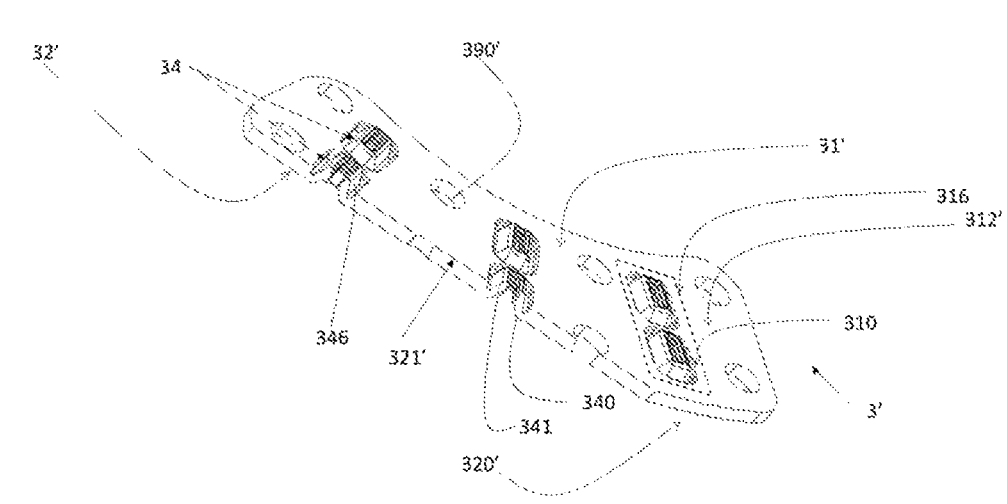
FIG. 12 shows a schematic depiction, in a three-dimensional view, of a cross section through a sealing gasket of the assembly of FIG. 8.

The sealing gasket 3' visible in FIG. 12 comprises, in this example of this embodiment, the fixing through-holes 390' passing from the sealing face 31' to the bearing face 32' for means for attaching the interconnector body 10' to the bearing body 2'. Each of these fixing through-holes 390' is situated between different sealing zones and passes through the intermediate portion 321' from the first surface 312' to the bearing surface 320'.

In this embodiment, the means of attaching the interconnector body 10' to the bearing body 2' are clip-fastening means 192' visible in FIG. 9. In particular, the interconnector body 10' comprises male clip-fastening means 192' which complement female clip-fastening means 291' belonging to the bearing body 2' and visible in FIG. 10*b*.

In this embodiment, the clip-fastening means 192' of the interconnector body 1' are studs having an elastically deformable end, each passing through one of the fixing holes 390' of the sealing gasket 3' which are visible in FIG. 12 and each passing through a hole 290' in the bearing body 2' so that the elastically deformable end has an outside diameter that is larger than the hole 290' in order to retain the stud. In particular, in this example, the bearing body 2' has a groove on a free face, the opposite face from the planar surface 20', surrounding each hole 290' and together forming the clip-fastening means 291' for retaining the elastically deformable end of the stud and preventing it from deforming again in order to leave the hole 290'.

Furthermore, in this example, the bearing body 2' comprises one phase output passage 200' per phase output 4, namely one phase output passage 200' per sealing opening 300. The gasket 3' is therefore mounted between the planar surface 102 of the interconnector body 10' and the planar surface 20' of the bearing body 2', with the projections 163 compressing the deformed surface 316 of the deformed portion 361.

The assembly E' is furthermore intended to be mounted between the stator S' and the bearing P of the electric machine M' depicted in FIG. 11. This FIG. 11 shows that the bearing P supporting a shaft for the rotation of a rotor R' of the electric machine M' extends from the yoke frame C' and in that the sealed interconnector E1' is mounted (to a large extent) axially between the bearing P and the active part of the electric machine M' comprising the rotor R' and the stator S'. In this example, only the connection outputs 115' of the tracks 11 are situated on the outside, passing through an opening in the bearing P. For example, a gasket may be mounted between the interconnector body 10' and the bearing P in the opening in order to achieve sealing.

In this example, and in a first stage, the interconnector assembly E is slipped over the phase outputs until it comes to bear against the winding overhang and then this assembly is correctly positioned in all 3 axes, before the steps of soldering the connections and filling with resin are performed. Next, the active part (rotor R' and stator S') and the sealed interconnector E1' are mounted blind into the yoke frame by inserting the rotor shaft into the bearing P. The interconnector body 10' comprises a fixing means 19P of attachment to the bearing P. In this example, because these components are mounted blind, and in order to limit the problems with sealing, the fixing means 19P is a toothed fixing rod that fits as a tight fit into a fixing recess P91 of the bearing 1' by deforming the fixing rod 19P into the recess P91. Furthermore, this rod may make it possible to angularly index the assembly E' with respect to the bearing P so as to cause the connection outputs 115' to enter the opening in the bearing P, until the interconnector body 10' and a connector gasket enter the opening in the bearing P. Once the stator S' with the interconnector E1' and the rotor R' have been mounted in the yoke frame S', a front bearing Pa is mounted against the yoke frame C' in order to support the rotor R'. Through-bolts enable the bearing Pa to be attached to the bearing P, sandwiching the stator S'.

Figure 13:
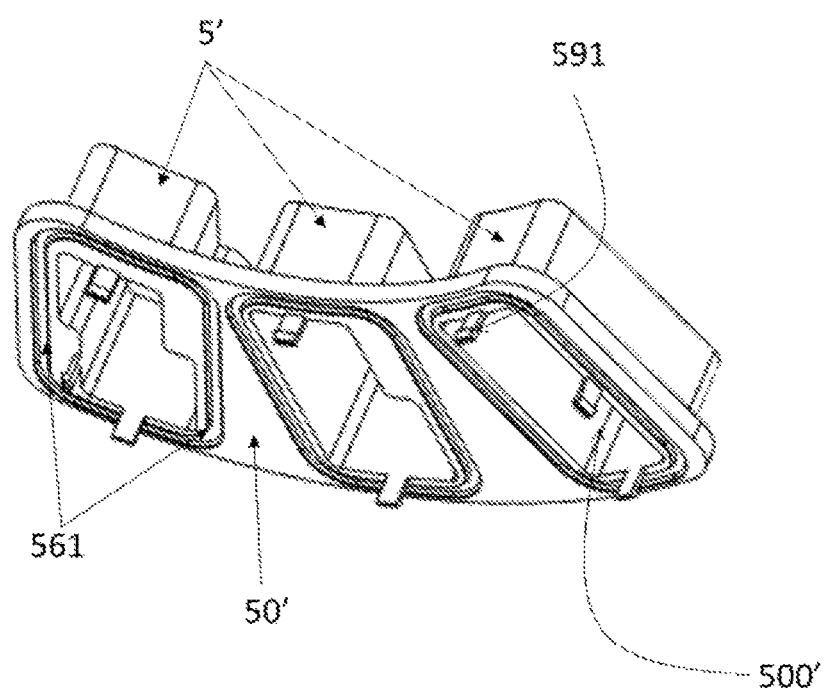
FIG. 13 shows a schematic depiction, in a three-dimensional view, of a reservoir body of the interconnector of FIG. 11.

Furthermore, in this example of this second embodiment, the reservoir body 50' depicted in FIG. 13 differs from the first embodiment in that each reservoir 5' comprises means 591 of clip-fastening to the interconnector body 10'. The clip-fastening means 591 extend from the end of the wall of the reservoir 5' surrounding the connection recess 500'. In this particular instance, the clip-fastening means 591 are flexible tabs comprising a hook to hook into the opening of the connection recess 100'. Of course, these fixing means may also be employed in the first embodiment, and vice-versa the bonding of the reservoir body 50' to the interconnector body 10' as used in the first embodiment may be employed in this second embodiment.

Figure 14:
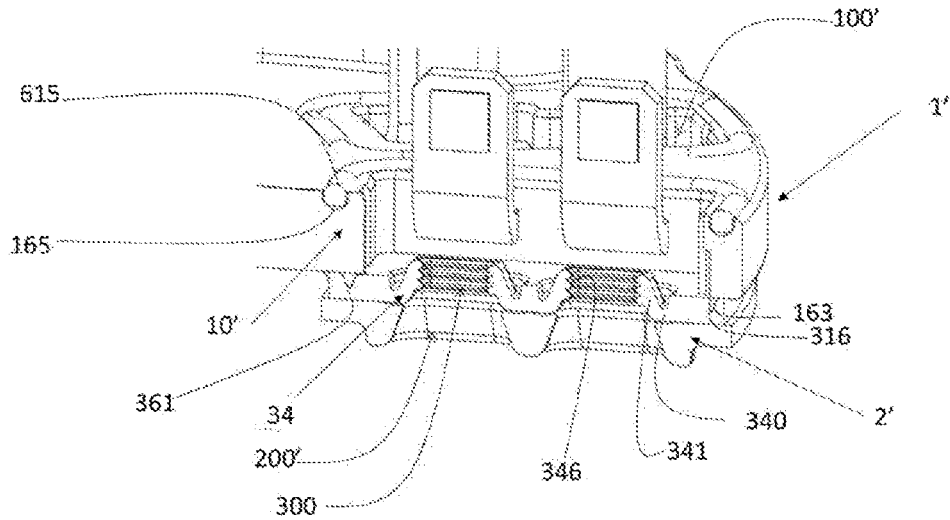
FIG. 14 shows a schematic depiction, in cross section, of part of the assembly of FIG. 8.

Further, the interconnector body 10' comprises at least one gasket groove 165, for a gasket 615, visible in FIG. 14, which depicts a cross section of the assembly E' through a connection recess opening 100'. In this example, there is one gasket groove 165 per connection recess opening 100'. Each groove 165 surrounds the connection recess opening 100' so as to accept the gasket 615, in this instance an O-ring. Each reservoir 5' comprises a groove 561, visible in FIG. 13, to accept the gasket 615. The sealed interconnector E1' comprises the gasket 615 which is sandwiched and compressed between the corresponding groove 165 of the interconnector housing 1' and the groove 561 of the corresponding reservoir 5'.

The connection ends 114, tracks 11, are similar to those of the first embodiment. The grommets 34 are identical to that of the first embodiment.

Figure 15:
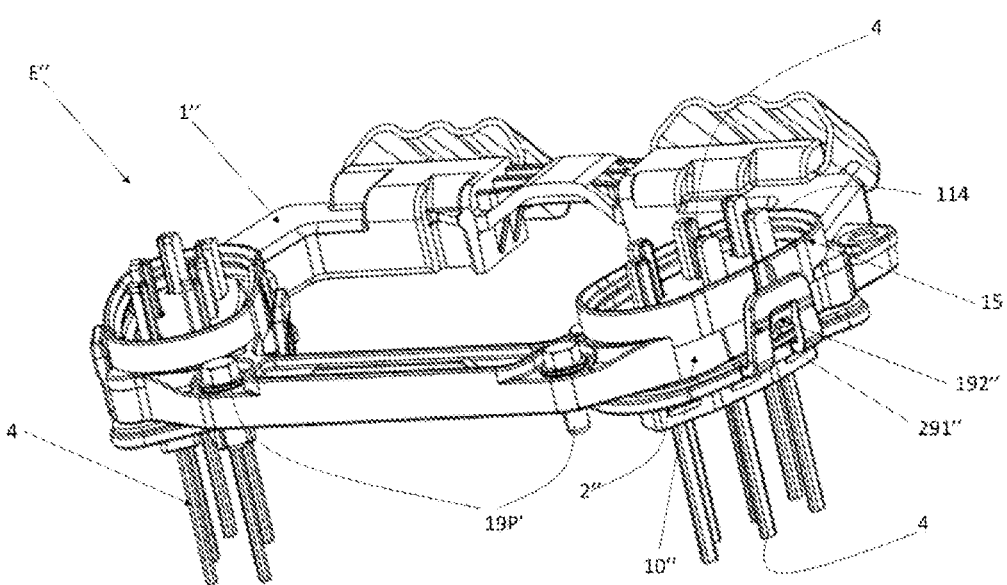
FIG. 15 shows a schematic depiction, in a three-dimensional view, of an assembly according to a third embodiment.
Figure 16:
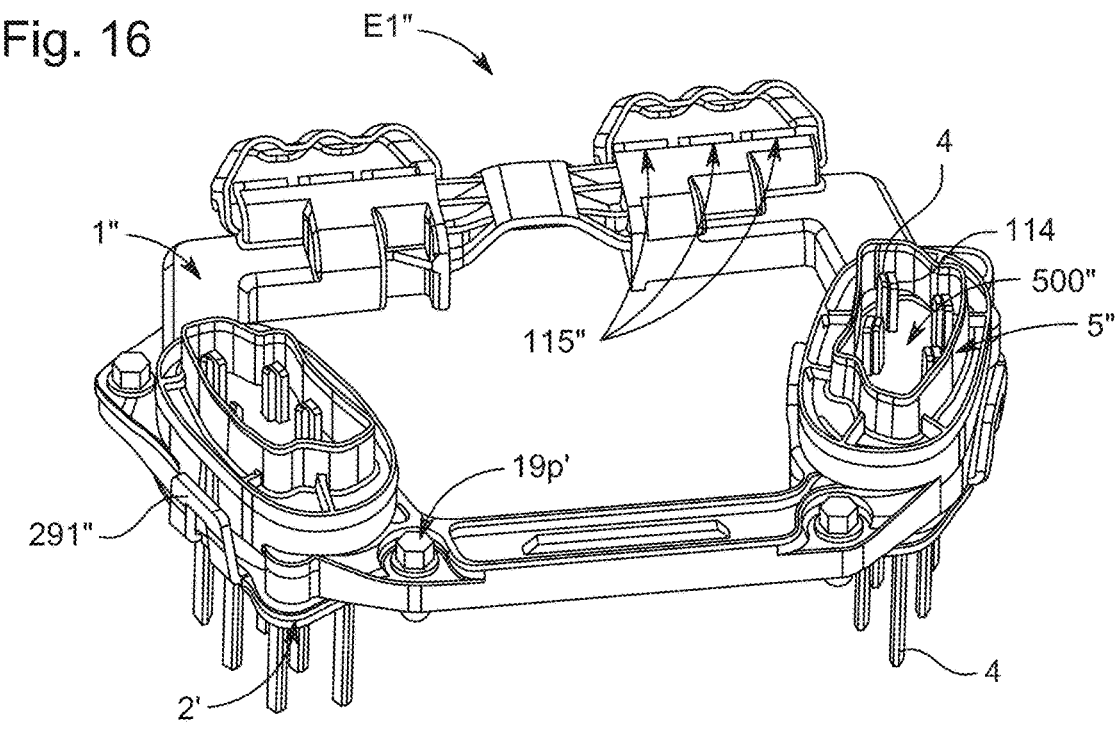
FIG. 16 shows a schematic depiction, in a three-dimensional view, of a sealed interconnector comprising the assembly of FIG. 15.

FIG. 15 depicts an assembly E" according to a third embodiment for forming an interconnector E1" depicted in FIG. 16. The assembly E" and the interconnector E1" differ from those of the second embodiment in terms of the features described in the paragraphs below. The features that are new take a new reference numeral and a single or double prime suffix (') is added to the reference numeral of those features that have been modified. The other features that are identical or similar bear the same reference numerals as in the first or second embodiment.

The sealed interconnector E1" depicted in FIG. 16 comprises a single connection recess 500" per three-face system, namely here a single reservoir 5" for six connections of phase outputs 4 to a connection end 114 (set up in the star configuration as in the first embodiment) of a track (which is not depicted in the figures of this second embodiment) of the interconnector housing 1".

Figure 17:
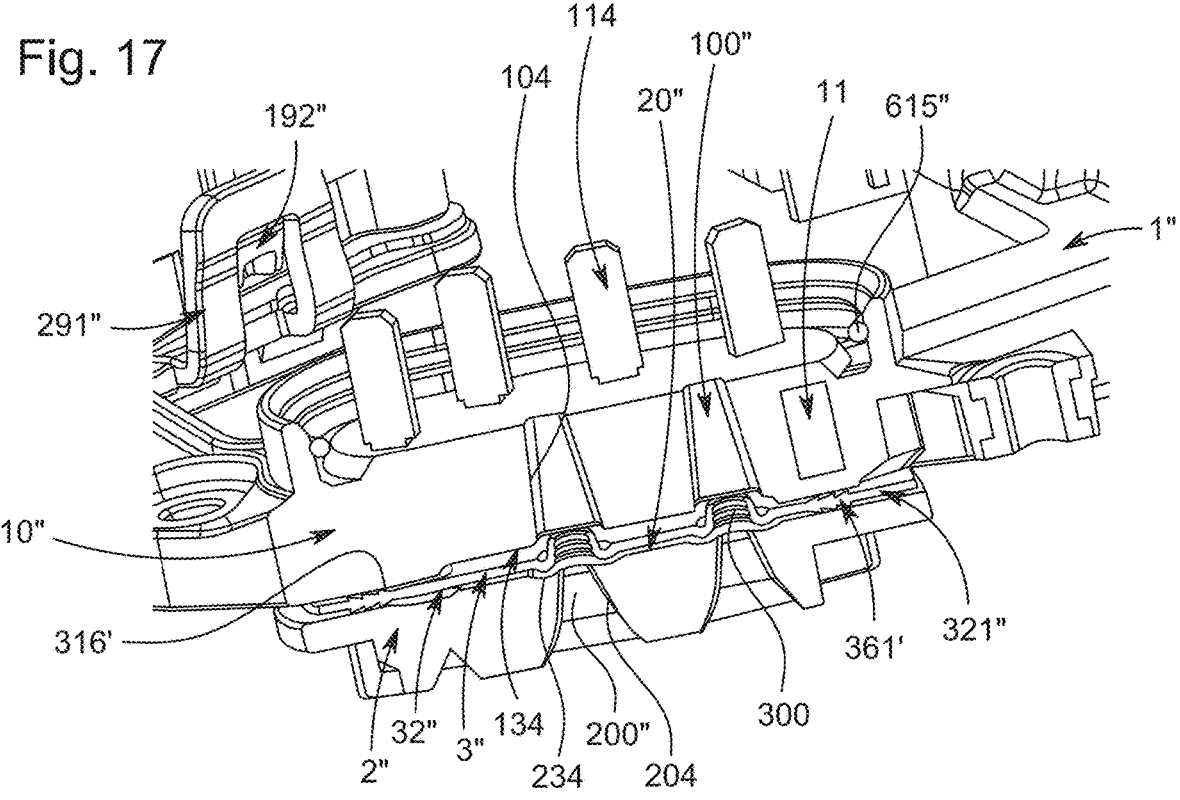
FIG. 17 shows a schematic depiction of a cross section through a portion of the assembly of FIG. 15.

The interconnector body 10" comprises a low wall 15 surrounding a portion of the volume of the connection recess 500" and a base 150 (referenced in FIG. 18) that is open onto each of the connection recess openings 100" and depicted in FIG. 17 in a cross section of the assembly at that portion of the connection recess volume 100". The interconnector body 10" comprises one connection recess opening 100" per phase output 4.

Further, the interconnector body 10" comprises guide surfaces 104 for each phase output 4 to guide the phase output toward the connection end 114, as is visible in FIG. 17. Further, and unlike in the examples of the preceding embodiments, each connection recess opening 100" opens onto a recess of the grommets 134 (in the first and second embodiments, the grommets sit directly in the connection recess opening 100).

The low wall 15 comprises a groove to accept the reservoir gasket 615" in order to provide sealing between the reservoir 5" and the interconnector housing 1".

In this example, the reservoir 5" is fitted tightly (tight fit) into the portion of the volume of the connection recess 500". In particular, the walls of the reservoir 5" have a part inside the portion of the volume of the connection recess 500" against the internal surface of the low wall 15, compressing the reservoir gasket 615" and another part against the low wall 15.

The fixing means for attaching the reservoir 5" to the interconnector body 10" here comprise an undercut angle of the walls of the reservoir 5" so that it can be fixed by the resin to the interconnector body 10".

The assembly E" comprises connections per three-phase system for connecting each connection output 115" that is intended to be connected to connections of the power electronics.

The fixing means 19p' for attaching the interconnector housing 1" to a bearing or some other component, comprise screws passing through a hole in the interconnector body 10". The interconnector E1" in this second embodiment is therefore not designed to be assembled blind. For example, the interconnector E1" may be mounted on an electric machine of the same type as that of the first embodiment.

The fixing means 19p' of the interconnector housing 1" have, in addition to the function of attaching the assembly E"

to, for example, a bearing P, a function of applying pressure to the sealing gasket 3" via the interconnector housing 1" against the bearing body 2" sandwiched, in this example, between the bearing and the interconnector body 10".

Figure 18:
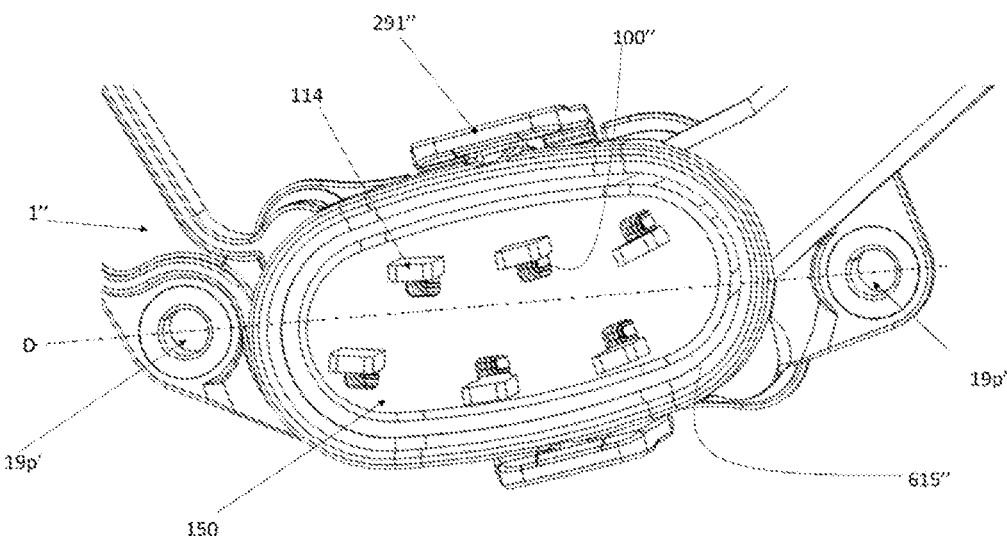
FIG. 18 shows a schematic depiction, viewed from above, of part of the assembly of FIG. 15.

Furthermore, as visible in FIG. 18 which depicts part of the assembly E" viewed from above, the two holes of the fixing means 19p' are situated in such a way that a straight line D passing through these two holes passes between the sealing openings 100" for the phase outputs 4. In this instance, the straight line D passes between three sealing openings 100" of three phase outputs 4 of three phases of a three-phase system, and the other three sealing openings 100" for the other three phase outputs 4 of these three phases. That allows the pressure applied by the fixing means 19P' to be applied evenly.

Figure 19:
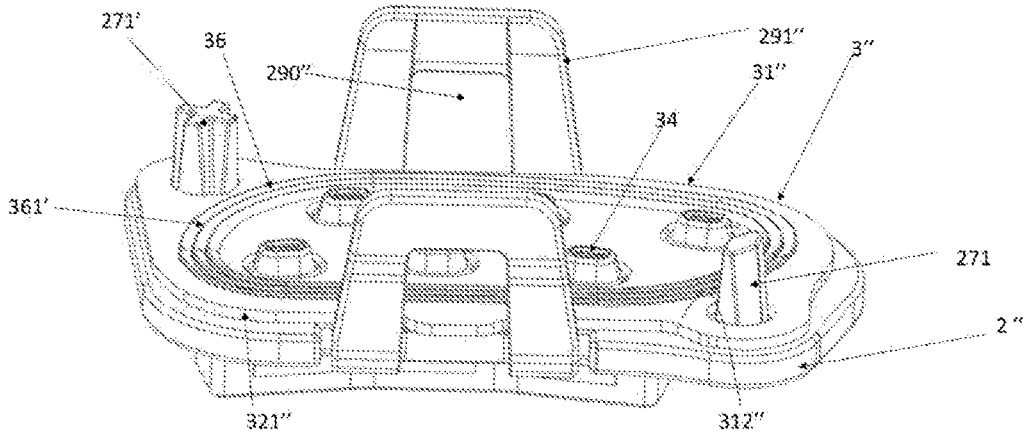
FIG. 19 shows a schematic depiction, in a three-dimensional view, of part of the assembly of FIG. 15.

Further, in this example of this assembly E", the clip-fastening means 291" for clip-fastening the bearing body 2" to the clip-fastening means 192" of the interconnector housing 1" differ from those of the first embodiment in that the sealing gasket 3" is positioned between the clip-fastening means 291", 192". In particular, the clip-fastening means 291" of the bearing body 2", which are visible in FIG. 19 which depicts the bearing body 2" and the sealing gasket 3", comprise a pair of clips, in this instance U-shaped clips comprising an opening 290", and extending beyond the planar surface 20" facing the sealing gasket 3". The clip-fastening means 192" of the interconnector body 10" which are visible in FIG. 15 comprise one hook per clip to fasten inside the opening 290" of the clips. The sealing gasket 3" therefore has no fixing through-hole like it did in the first embodiment.

Figure 20A:
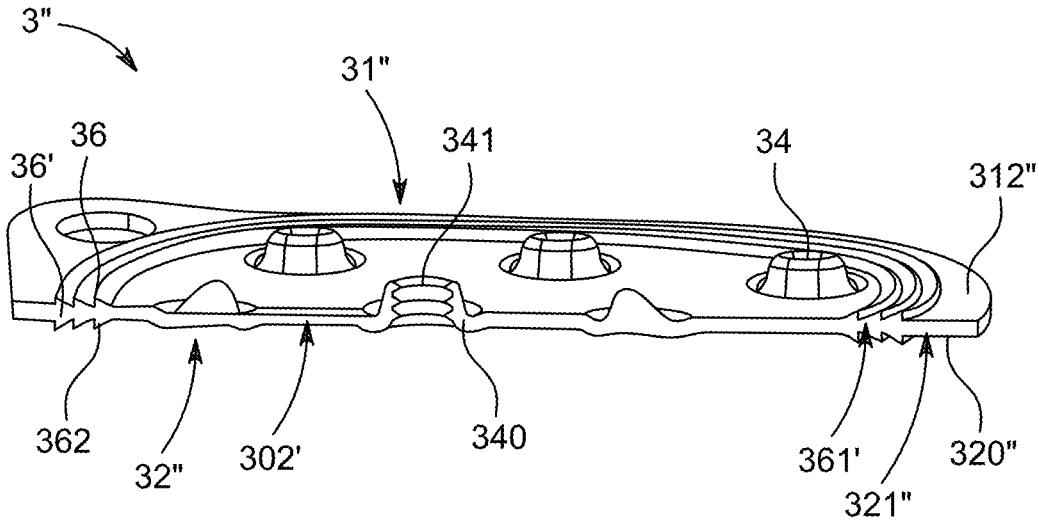
FIG. 20a shows a schematic depiction of a cross section through a sealing gasket of the assembly of FIG. 15.
Figure 20B:
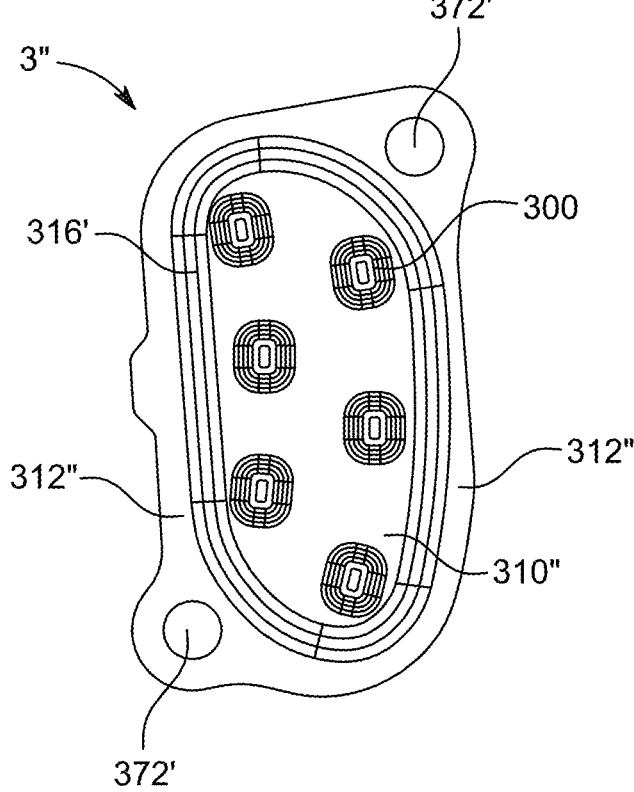
FIG. 20b shows a schematic depiction, in a three-dimensional view, of the sealing gasket of the assembly of FIG. 15.

The bearing body 2" in this example comprises at least one indexing means 271, 271' for indexing the bearing body 2" in relation to the sealing gasket 3" and the interconnector housing 1". In this particular instance here, the bearing body 2" in this example comprises two indexing means 271, 271' in the form of fingers, visible in FIG. 19, each passing through an indexing opening 372' of the gasket 3" (which opening is referenced in FIG. 20b), in order to enter a hole in the interconnector housing 1". That enables the sealing gasket 3" to be correctly positioned on the bearing body 2" for assembling the interconnector housing 1".

The bearing body 2" in this example comprises guide walls 204 surrounding each phase output passage 200" facing a single sealing opening 300. Further, in this example, each guide wall 204 opens onto a grommet recess 234. The grommet recess 234 has a cross section that is larger than the smallest cross section of the phase output passage 200" delimited between the guide walls 204, and forms an indentation relative to the planar surface 20" of the bearing body 2", visible in FIG. 17.

Finally, in this embodiment, the sealing zone sealing between the interconnector body 10" and the sealing gasket 3" is embodied differently in that the sealing gasket 3" comprises at least one sealing projection 36 on the sealing face 31", this being depicted for example in FIGS. 17, 19, 20a, 20b. In this example the interconnector body 10" has no projection. The deformed portion 361' of the sealing gasket 3" therefore comprises sealing projections 36 relative to the first surface 312", forming the deformed surface 316'. In this example, as an option, the deformed portion 361' of the sealing gasket 3" further comprises bearing projections 36' on the bearing face 32" opposite to the sealing projections 36 which are situated on the sealing face 31", forming a second deformed surface 362.

Further, in this example of this embodiment, the sealing projections 36 and, optionally, the bearing projections 36', surround all of the grommets 34 of the sealing gasket 3". The deformed portion 361' therefore surrounds the membrane portion 302' and, on the one hand, forms a first clearance between the filling surface 310" of this membrane portion 302' and the grommet recess 134 of the interconnector body 10" opposite and, on the other hand, forms a second clearance between this membrane portion 302' and the interconnector body 2'. These clearances give the sealing gasket 3" the play it needs in order to adopt the necessary shape for helping each grommet 34 to seal the sealing opening 300 through which a phase output 4 passes. The interconnector E1" therefore has resin covering this filling surface 310".

A second clearance may be formed between the first surface 312" of the intermediate portion 321" and the interconnector body 10", making it possible to ensure that the interconnector body 10" compresses the sealing projections 36, 36' against the planar surface 20" that forms a bearing surface. A clearance may also be formed between the bearing surface 320" of the bearing face 32", which is the opposite face from the first surface 312", and the bearing body 2", making it possible to ensure that the bearing body 2" compresses the sealing projections 36, 36' that form the deformed surface 362.

In this example, the sealing zone formed by the sealing projections 36', 36" surrounds all of the grommets 34 of the sealing gasket 3". In this example there is therefore just one sealing zone formed by the sealing projections 36', 36", but in another example there could be several of these, as the example of the first embodiment did.

The grommets 34 are identical to those of the first embodiment.

In all three embodiments, the interconnector E1, E1', E1" comprises reservoirs 5, 5', 5" for protecting the resin, but it is possible for the interconnector E1, E1', E1" not to be provided with such reservoirs 5, 5', 5". Specifically, that would mean that the interconnector body 10, 10', 10" may form the reservoirs 5, 5' (although the soldering-together of the phase output 4 and the connection end 114 is then more difficult). The reservoir 5, 5', 5" may also be a mold having an undercut, which mold is then removed once the resin has hardened (in which case the resin is no longer protected by the reservoir).

Unless stated otherwise, the same element appearing in different figures is provided with a single reference.

The invention claimed is:

1. An assembly for an interconnector of an electric machine, comprising:
   an interconnector housing comprising:
      a body comprising at least one connection recess opening passing through the body, and intended to be filled with resin,
      one track per phase, each track comprising a connection end to be connected to a phase output,
   a gasket mounted on the interconnector housing and comprising:
      a dividing wall partially closing the connection recess opening, and
      at least one flexible sealing grommet for a phase output, the sealing grommet extending from the dividing wall, toward the connection recess opening, the grommet comprising:
         a conduit extending toward the connection recess opening,
         a phase output sealing opening passing through the conduit to lead a phase output into the connection recess opening, a gaiter extending from the dividing wall to the conduit to allow the conduit to move as a phase output is being inserted into the sealing opening, wherein the body is overmolded over the tracks.

2. The assembly as claimed in claim 1, wherein the conduit comprises at least an internal lip extending in the conduit right around the sealing opening in order to deform and seal the sealing opening by coming into contact with the phase outputs.

3. The assembly as claimed in the claim 2, wherein the sealing opening has an axis of insertion of a phase output toward the connection end and in that the number of internal lips right around the sealing opening for coming into contact with the phase outputs is greater than or equal to two, and in that the internal lips are situated one after another in the direction of insertion all along the sealing opening in the conduit.

4. The assembly as claimed in claim 1, wherein the gasket comprises:

a sealing face comprising a surface deformed against the interconnector housing a bearing face on the opposite side to the sealing face, and in that the gaiter has a concave surface on the same side as the sealing face and a convex surface on the same side as the bearing face.

5. The assembly as claimed in claim 4, wherein the concave surface forms a groove around the conduit with respect to the dividing wall.

6. The assembly as claimed in claim 1, comprising a bearing body fixed to the interconnector housing and comprising a planar surface which with the interconnector body compresses a deformed portion of the sealing gasket surrounding the dividing wall, and in that the bearing body comprises at least one phase output passage passing through the planar surface.

7. The assembly as claimed in claim 6, wherein the bearing body is clipped onto the interconnector housing.

8. The assembly as claimed in claim 6, wherein the bearing body includes a bearing of an electric machine.

9. An electric machine comprising:

the assembly as claimed in claim 1, a stator comprising phase outputs each passing through the corresponding sealing opening and the at least one corresponding connection recess opening, wherein each phase output end is fixed to a corresponding connection end, resin filling the connection recess opening in contact with the gasket forming a sealed interconnector.

10. The electric machine as claimed in claim 9, wherein the interconnector further comprises a reservoir fixed to the interconnector housing forming a connection recess surrounding at least one phase output fixed to a corresponding connection end, the connection recess being filled with resin.

11. The assembly as claimed in claim 2, wherein gasket comprises:

a sealing face comprising a surface deformed against the interconnector housing a bearing face on the opposite side to the sealing face, and in that the gaiter has a concave surface on the same side as the sealing face and a convex surface on the same side as the bearing face.

12. The assembly as claimed in claim 2, comprising a bearing body fixed to the interconnector housing and comprising a planar surface which with the interconnector body compresses a deformed portion of the sealing gasket surrounding the dividing wall, and in that the bearing body comprises at least one phase output passage passing through the planar surface.

13. An electric machine comprising:

the assembly as claimed in claim 2, a stator comprising phase outputs each passing through the corresponding sealing opening and the at least one corresponding connection recess opening, wherein each phase output end is fixed to a corresponding connection end, resin filling the connection recess opening in contact with the gasket forming a sealed interconnector.

14. The assembly as claimed in claim 3, wherein the gasket comprises:

a sealing face comprising a surface deformed against the interconnector housing a bearing face on the opposite side to the sealing face, and in that the gaiter has a concave surface on the same side as the sealing face and a convex surface on the same side as the bearing face.

15. The assembly as claimed in claim 3, comprising a bearing body fixed to the interconnector housing and comprising a planar surface which with the interconnector body compresses a deformed portion of the sealing gasket surrounding the dividing wall, and in that the bearing body comprises at least one phase output passage passing through the planar surface.

16. An electric machine comprising:

the assembly as claimed in claim 3, a stator comprising phase outputs each passing through the corresponding sealing opening and the at least one corresponding connection recess opening, wherein each phase output end is fixed to a corresponding connection end, resin filling the connection recess opening in contact with the gasket forming a sealed interconnector.

17. The assembly as claimed in claim 4, comprising a bearing body fixed to the interconnector housing and comprising a planar surface which with the interconnector body compresses a deformed portion of the sealing gasket surrounding the dividing wall, and in that the bearing body comprises at least one phase output passage passing through the planar surface.

18. An electric machine comprising:

the assembly as claimed in claim 4, a stator comprising phase outputs each passing through the corresponding sealing opening and the at least one corresponding connection recess opening, wherein each phase output end is fixed to a corresponding connection end, resin filling the connection recess opening in contact with the gasket forming a sealed interconnector.

19. The assembly as claimed in claim 5, comprising a bearing body fixed to the interconnector housing and comprising a planar surface which with the interconnector body compresses a deformed portion of the sealing gasket surrounding the dividing wall, and in that the bearing body comprises at least one phase output passage passing through the planar surface.

20. An electric machine comprising:

the assembly as claimed in claim 5, a stator comprising phase outputs each passing through the corresponding sealing opening and the at least one corresponding connection recess opening, wherein each phase output end is fixed to a corresponding connection end, resin filling the connection recess opening in contact with the gasket forming a sealed interconnector.

* * * * *